US008670483B2

(12) United States Patent
Morphet et al.

(10) Patent No.: US 8,670,483 B2
(45) Date of Patent: Mar. 11, 2014

(54) OBJECT TRACKING USING GRAPHICS ENGINE DERIVED VECTORS IN A MOTION ESTIMATION SYSTEM

(75) Inventors: Stephen Morphet, St. Albans (GB); Steven Fishwick, Kings Langley (GB)

(73) Assignee: Imagination Technologies, Ltd., Kings Langley, Hertfordshire (GB)

( * ) Notice: Subject to any disclaimer, the term of this patent is extended or adjusted under 35 U.S.C. 154(b) by 0 days.

(21) Appl. No.: 12/932,421

(22) Filed: Feb. 24, 2011

(65) Prior Publication Data

US 2011/0206124 A1    Aug. 25, 2011

(30) Foreign Application Priority Data

Feb. 25, 2010 (GB) .................................. 1003223.3

(51) Int. Cl.
*H04N 7/18* (2006.01)
(52) U.S. Cl.
USPC ................................. 375/240.16; 375/240.17
(58) Field of Classification Search
USPC ................. 375/240.01–240.29; 348/699–702
See application file for complete search history.

(56) References Cited

U.S. PATENT DOCUMENTS 5,872,604 A    2/1999  Ogura
7,689,031 B2 *  3/2010  Berretty et al. ............... 382/154

2003/0063673 A1    4/2003  Riemens et al.
2008/0187047 A1    8/2008  Stephan et al.
2010/0014588 A1    1/2010  Nakazato et al.

FOREIGN PATENT DOCUMENTS

| EP | 1 225 769 A3 | 7/2002 |
| EP | 1610560 A | 12/2005 |
| WO | 02060183 A | 8/2002 |

OTHER PUBLICATIONS

United Kingdom Search Report dated Apr. 30, 2010, (2 pages).
Kim, Jae Hoon, et al. "New Coding Tools for Illumination and Focus Mismatch Compensation in Multiview Video Coding" IEEE Trans. on Circuits and Systems for Video Technology, vol. 17, No. 11, Nov. 2007.

* cited by examiner

*Primary Examiner* — Andy Rao
(74) *Attorney, Agent, or Firm* — Michael S. Garrabrants

(57) ABSTRACT

A method and apparatus are provided for motion estimation in a sequence of images. One or more motion vectors representing movement of a camera or viewer position or direction are determined between each pair of fields or frames in the sequence of images. A set of candidate motion vectors is then determined for deriving positions of objects in a field or frame from the positions of objects in a previous field or frame. This set of candidate motion vectors is adjusted using the motion vectors representing movement of the camera or viewer position and thus a set of motion vectors is derived for a sequence of images using the adjusted set of candidate motion vectors.

23 Claims, 12 Drawing Sheets

Frame n-1

Frame n

A typical block matching motion estimator

A typical block matching motion estimator

Choosing a vector from a set of candidates

Screen space motion resulting from translation of the camera position along a vector parallel to the Y-axis of the screen Screen space motion resulting from translation of the camera position towards the scene along a vector perpendicular to the screen Screen space motion resulting from rotation of the camera orientation around an axis parallel to the X-axis of the screen Screen space motion resulting from rotation of the camera around an axis perpendicular to the screen The dependence of screen space motion resulting from camera movement on camera to object distance Coordinate systems in 3D graphics Effective motion of an object in screen space composed of a vector due to motion of the object in world space and a vector due to transformation of the camera/viewer Pixels classified by depth value Momentum vector lookup without camera movement compensation Momentum vector lookup with camera movement compensation Block diagram of a traditional motion estimator Block diagram of a motion estimator using approximations of the camera/viewer position and orientation Block diagram of a motion estimator using graphics engine derived vectors

OBJECT TRACKING USING GRAPHICS ENGINE DERIVED VECTORS IN A MOTION ESTIMATION SYSTEM

This invention relates to motion estimation of a sequence of input images, in particular to methods associated with generating candidate motion vectors based on the orientation and position of the camera/viewer.

BACKGROUND TO THE INVENTION

Motion estimation, the identification of motion in a sequence of images, frames or video fields is well known. Existing methods of motion estimation typically consider two or more frames from a sequence and create a set of motion vectors that represents the 2D translational motion of image areas from one frame to the next. One possible technique for motion estimation is a motion search, in which a previous frame is searched to find an area of the image that best matches a particular area in the current frame. The difference in the position of the two matching areas gives the motion vector at the current position.

Different systems have different requirements of the motion estimator. In a compression system such as a video encoder, the requirement is to form the most compact representation of a frame, by reference to a previous frame from the sequence. The requirement is generally to find motion vectors which give the best matches between areas of pixels in the current frame and the reference frame, as this leads to the most compact encoding. While the resulting motion vectors are usually representative of the actual motion of objects in the scene, there is no requirement that this is always the case. In other applications, such as object tracking or frame rate conversion, it is more important that the motion vectors represent the true motion of the scene, even if other distortions in the video mean that the pixels in the corresponding image areas are not always the best possible match to each other. By applying appropriate constraints during the motion search procedure, the results can be guided towards "best pixel match" or "true motion" as necessary. Collectively, the set of motion vectors in a frame is known as the motion vector field for that frame. Note that use of the term "vector field" should not be confused with the use of "field" or "video field" to describe the data in an interlaced video sequence, as described below.

While many approaches to motion estimation exist, a common implementation is that of a block based motion estimator. The invention disclosed in this patent will be described by showing how it can be used with a block based motion estimator, although the principles of the invention may also be applied to motion estimators of other types. In a block based motion estimator, frames are subdivided, typically into a regular grid of rectangular areas known as blocks or macroblocks. In a motion search procedure, each block's pixel data is compared with pixel data from various candidate locations in the previous frame and a scoring function is computed for each candidate. The relative positions of the blocks with the best score gives the motion vector at the current block position.

FIG. 1 illustrates a typical example of a block matching motion estimator. In all the figures, including FIG. 1, motion vectors are shown with the head of the arrow at the centre of the block to which the vector corresponds. The frames are divided into blocks, and an object 101 in the previous frame has moved to position 102 in the current frame. The previous position of the object is shown superimposed on the current frame as 103. Motion estimation is performed for blocks rather than for objects, where a block of pixels in the current frame is matched with a block sized pixel area in the previous frame which is not necessarily block aligned. For example, block 104 is partially overlapped by the moving object 102, and has contents as illustrated at 105. Motion estimation for block 104, if it performs well, will find the pixel data area 106 in the previous frame, which can also be seen to contain the pixels illustrated in 105, i.e. a good match has been found. Superimposed back onto the current frame, the matching pixel data area is at 107. The motion vector associated with block 104 is therefore as illustrated by arrow 108.

Rather than exhaustively consider every possible location, many block based motion estimators select their output motion vector by testing a set of motion vector candidates with a scoring function such as a sum of absolute differences (SAD) or mean of squared differences (MSD), to identify motion vectors which give the lowest error block matches. FIG. 2 illustrates the candidate evaluation process for the block 201 in the current frame which has pixel contents shown in 211. In this simple example system, three motion vector candidates 206, 207 and 208 are considered which correspond to candidate pixel data areas at locations 202, 203 and 204 in the previous frame. The pixel contents of these pixel data areas can be seen in 212, 213 and 214 respectively. It is apparent that the pixel data at location 202 provides the best match for block 201 and should therefore be selected as the best match/lowest difference candidate. Superimposed back onto the current frame, the matching pixel data area is at 205 and the associated motion vector is 206.

Motion vectors are known to be highly correlated both spatially and temporally with vectors in adjacent blocks, so these neighbouring vectors are often used as the basis for the set of candidate motion vectors considered in the motion estimation for a particular block. A random element may also be incorporated into the candidates to allow the system to adapt as the motion in the video changes. Where a block has motion that is not simply predicted by its neighbours, a system may rely on random perturbation of vector candidates known as jitter. This works well for slowly changing vector fields, but tends not to allow the motion estimator to converge rapidly to a new vector where it is very different to its neighbours. A system relying on randomness may wander towards the correct motion over time, but is prone to becoming stuck in local minima, or converging so slowly that the motion has changed again by the time it gets there. It is therefore desirable to introduce candidates that can more accurately predict new and changing motion or improve the selection of candidate motion vectors to improve the speed of convergence of the vector field. The number of candidate motion vectors tested for each block is often a compromise between choosing a set large enough to identify true motion and/or provide good matches with a low residual error, while being small enough to minimize computational expense.

Video sequences typically comprise a series of non interlaced frames of video data, or a series of interlaced fields of video data. The interlaced sequences are produced by fields which carry data on alternate lines of a display, such that a first field will carry data for alternate lines, and a second field will carry data for the missing lines. The fields are thus spaced both temporally and spatially. Every alternate field in a sequence will carry data at the same spatial locations.

Not all video sequences are comprised of "real" images such as may be produced by a video camera. Applications such as games, virtual reality environments, Computer Aided Design (CAD) systems, etc., typically output a series of images which may be referred to as artificially generated video sequences.

In computer graphics, and particularly in 3D computer graphics, a number of coordinate systems are commonly used. FIG. 8 shows three important coordinate systems. The world space is a space with an arbitrary origin, 800, in which a camera (or eye) point, 810, a screen position, 820, and three objects, 830, 840, and 850, are shown in plan view. The direction in which the camera is pointing is shown as 860. An initial step in rendering this scene is to transform the objects into the camera space. In the camera space, also shown in plan view, the camera is at the origin and points along the z axis. The screen 820, is perpendicular to the view direction. A second step projects the objects into screen space, where the x,y position of an object on the screen depends not only on its x,y position, but also its z coordinate in the camera space. This is therefore a perspective projection, which helps to give the scene a "three dimensional" appearance.

In a motion estimation system processing a conventional video sequence, the movement of an object is considered to be the distance that the object's representation on the display screen moves between frames. The motion estimation process occurs entirely in screen space. In reality, the motion of an object on the display screen is determined by the motion of the object in the world space, the projection of that motion onto the screen, and also upon any change in the position and orientation of the camera. This is true for both video sequences and artificially generated sequences, but can present a particular problem in artificially generated sequences such as 3D games, where rapid motion is often combined with sudden changes in view direction. These camera movements cannot easily be predicted by the motion estimator, and motion estimation performance suffers as a result.

In order to render an artificial scene, the graphics engine responsible for creating the sequence of frames must have knowledge about objects in the scene as well as details about the camera position and orientation. While the position and motion of objects in a scene is usually unavailable outside of the graphics engine, it is common for graphics engines to provide an API (application programming interface) which allows some information to be made available to other applications. Conveniently, many APIs provide details of the camera location and orientation, often in the form of matrices describing the transformation from world to camera space, and the projection into screen space. It is also often possible to access depth (or 'Z') buffer information, which stores the depths of objects at each pixel position in the screen space rendered image.

Where the video sequence has been produced using a conventional 2D video camera, camera position and depth information is not normally available. Nevertheless, if this information, or an approximation to it, can be produced, then this invention may still be used to improve motion estimation. Possible approaches to approximating camera location, orientation and distance to objects in a scene may be derived using "Structure from Motion" techniques in the field of Computer Vision.

PRIOR ART

Agrawala, Beers, and Chadda. Model-Based Motion Estimation for Synthetic Animations. ACM Multimedia 1995.

SUMMARY OF THE INVENTION

The present invention introduces an efficient method of generating candidate motion vectors that are derived from the position and orientation of the camera and optionally from the distance between the camera and objects in the scene. Changes to the position and orientation of the camera contribute to the screen space motion of an object in a predictable way that can be used to guide the choice of motion vector candidates.

When camera movements are combined with object depth information, the resulting screen space object motion can be determined mathematically. By representing object motion in screen space as the combination of motion due to camera movement and motion due to object movement in world space, further improvements in motion estimation performance can be achieved.

These methods work by introducing motion vector candidates that may otherwise have been unavailable through other vector propagation techniques relying on temporally and spatially derived candidates, and provide a more efficient method of tracking motion that accommodates apparent motion due to changes in the camera/viewer position. The present invention may overcome erratic motion introduced by a user controlled camera, allow faster convergence in areas of rapid or changing motion, allow fewer candidates to be considered, and/or compensate for changes in viewer location all resulting in more accurate motion vector fields.

BRIEF DESCRIPTION OF THE DRAWINGS

Preferred embodiments of the invention will now be described in detail by way of example, with reference to the accompanying drawings in which.

DETAILED DESCRIPTIONS OF THE PREFERRED EMBODIMENTS

In all the figures, motion vectors are shown with the head of the arrow at the centre of the block to which the vector corresponds and, for simplicity, objects are considered to be of point size.

Examples of Typical Camera Movements:

FIG. 3 to FIG. 6 illustrate examples of various typical camera movements, and show the apparent motion vectors that might be expected to result.

Figure 3:
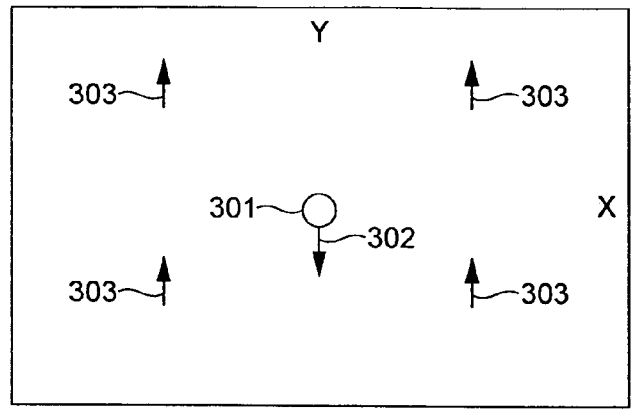
FIG. 3 illustrates the screen space motion resulting from translation of the camera position along a vector parallel to the screen.

FIG. 3 shows a camera moving in a direction parallel to the Y axis of the screen. For a camera pointing at point 301, and translating in the direction shown by vector 302, i.e. downwards, the apparent motion of objects on the screen is upwards, as shown by vectors 303. A similar situation exists for translation along other vectors parallel to the screen plane.

Figure 4:
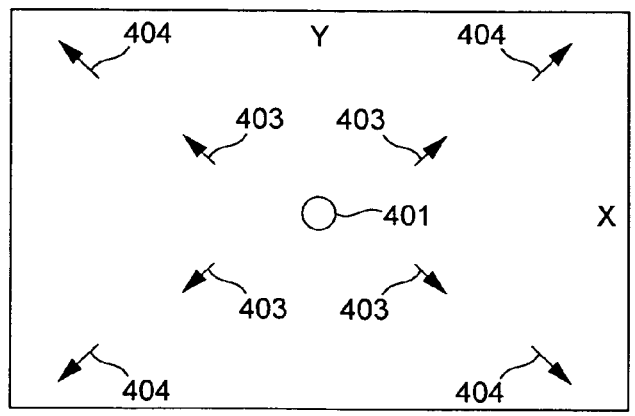
FIG. 4 illustrates the screen space motion resulting from translation of the camera position along a vector perpendicular to the screen.

FIG. 4 shows a camera moving in a direction perpendicular to the screen. The camera is pointing at point 401 and moving towards the scene. The apparent motion of objects in the scene is therefore outwards from the centre, as shown by vectors 403 and 404. Objects closer to the centre of the screen will have smaller vectors, e.g. 403, while objects nearer the edges of the screen will have larger vectors, e.g. 404.

Figure 5:
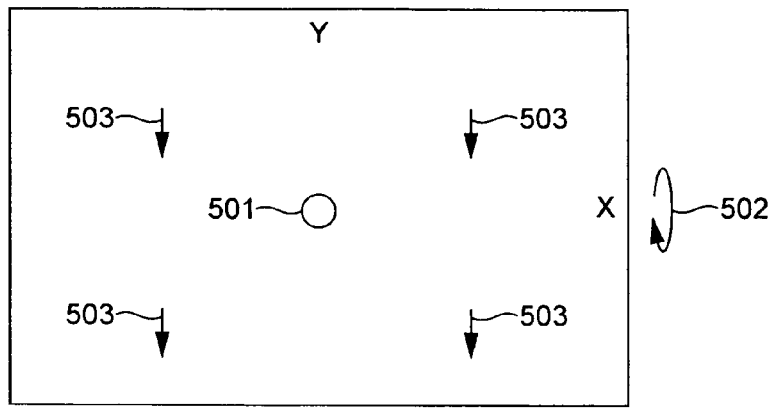
FIG. 5 illustrates screen space motion resulting from rotation of the camera orientation around an axis parallel to the screen.

FIG. 5 shows a camera rotating about an axis parallel to the X axis of the screen. The camera is pointing at point 501, and is rotating in an upwards direction, as shown by 502. The apparent motion of objects on the screen is downwards, as shown by vectors 503.

Figure 6:
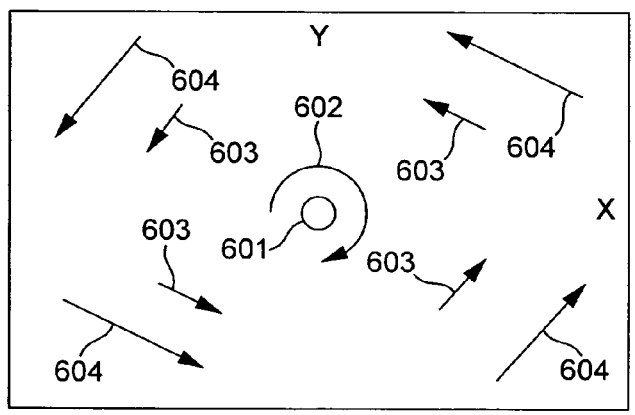
FIG. 6 illustrates screen space motion resulting from rotation of the camera around an axis perpendicular to the screen.

FIG. 6 shows a camera rotating about an axis perpendicular to the screen. The camera is pointing at point 601 and rotating as shown by 602. Objects in the scene appear to move along arcs, with motion vectors tangential to the arcs, such as 603 and 604. Objects closer to the centre of the screen will have smaller vectors, e.g. 603, while objects nearer the edges of the screen will have larger vectors, e.g. 604.

3D Geometry.

Geometry in a three dimensional computer application, such as a game, is typically given in homogeneous coordinates. This representation will allow a transformation matrix to be defined which incorporates the six degrees of freedom (three translations and three rotations) of the camera position.

For a point, p in world space, the transformation to the corresponding point, q, in camera space is given by:

$$p = \begin{bmatrix} p_x \\ p_y \\ p_z \\ 1 \end{bmatrix}$$

$$C = \begin{bmatrix} r_1 & r_2 & r_3 & t_x \\ r_4 & r_5 & r_6 & t_y \\ r_7 & r_8 & r_9 & t_z \\ 0 & 0 & 0 & 1 \end{bmatrix}$$

$$q = Cp$$

In the camera matrix C the terms $t_x$, $t_y$, and $t_z$ represent translation, and the terms $r_1$ to $r_9$ represent rotation. The skilled person will be aware that the matrix can also represent transformations such as scaling and shearing, but these are rarely used in the camera transform.

The projection of q into homogeneous screen space vector r is then given by the projection matrix P, where the vector d incorporates $d_x$ and $d_y$, the offset to the corner of the screen, and $d_z$, the distance from the camera to the screen:

$$P = \begin{bmatrix} 1 & 0 & 0 & d_x \\ 0 & 1 & 0 & d_y \\ 0 & 0 & 1 & 0 \\ 0 & 0 & 1/d_z & 0 \end{bmatrix}$$

$$r = Pq$$

Finally, a divide by the homogeneous coordinate, gives the location of the point s on the 2D screen. A scale factor is not shown, but may also be required to map the image correctly onto the coordinate system of the display device:

$$s = \begin{bmatrix} r_x/r_w \\ r_y/r_w \end{bmatrix}$$

Typically, a depth buffer will store the homogeneous depth coordinate, $r_w$.

Camera Movement

The problem that must be solved is to determine the screen space position $s_{n-1}$ in the previous frame of a point $s_n$ in the current frame, given a change in camera matrix from $C_{n-1}$ to $C_n$. We will see later how the actual screen space position of an object $s_{n-1}$ may differ from the prediction. Calculation of $s_{n-1}$ can be achieved by first reconstructing $r_n$ from $s_n$, and transforming it back into the world space position, $p_n$. Assuming that the point does not move in world space, i.e., that $p_n=p_{n-1}$, the point $p_{n-1}$ may then be transformed back into the screen space coordinate, $s_{n-1}$, using the method shown above.

Notice that to construct the 4D vector $r_n$ from 2D vector $s_n$, we must use information from elsewhere. The homogeneous depth, $r_w$, is retrieved from the depth buffer. The $r_z$ term appears to have been lost, but can be recomputed, since we know from the projection matrix P that $r_z=q_z$ and $r_w=q_z/d_z$. In the equations below, note that we use different projection matrices, $P_n$ and $P_{n-1}$, to allow for the unlikely possibility that the projection may change between frames:

$$r_n = \begin{bmatrix} s_{x,n} \cdot r_{w,n} \\ s_{y,n} \cdot r_{w,n} \\ r_{w,n} \cdot d_{z,n} \\ r_{w,n} \end{bmatrix}$$

$$p_n = C_n^{-1} P_n^{-1} r_n$$

$$r_{n-1} = P_{n-1} C_{n-1} p_{n-1}$$

If world space position $p_n$ is equal to $p_{n-1}$ then:

$$r_{n-1} = P_{n-1}C_{n-1}p_{n-1}$$
$$= P_{n-1}C_{n-1}p_n$$
$$= P_{n-1}C_{n-1}C_n^{-1}P_n^{-1}r_n$$

$$s_{n-1} = \begin{bmatrix} r_{x,n-1}/r_{w,n-1} \\ r_{y,n-1}/r_{w,n-1} \end{bmatrix}$$

From the original screen space position of a point, $s_n$, and the predicted screen space position in the previous frame, $s_{n-1}$, a motion vector can be calculated simply from the difference between the two vectors:

$$m_{camera} = s_n - s_{n-1}$$

Since it is based on predicted position $s_{n-1}$, this motion vector is also a prediction. The prediction is based on the assumption that world space position $p_n$ is equal to $p_{n-1}$, i.e. that the point has not moved in the world space. The assumption is clearly not always true, as the vast majority of 3D applications include moving objects. It is, however, the case that even in a scene containing moving objects, there are large areas, perhaps even the majority of each image, that display only background and static objects. In these areas the predicted motion vector due to camera movement, $m_{camera}$, is highly likely to be a useful motion vector candidate.

Moving Objects

When the camera is stationary and an object moves in world space from $p'_{n-1}$ to $p'_n$, a corresponding change in screen space occurs from $s'_{n-1}$ to $s'_n$, where $s'_{n-1}$ and $s'_n$ are derived from $p'_{n-1}$ and $p'_n$ using the coordinate system transforms outlined above. The prime notation is used here to distinguish the coordinates of moving objects from the earlier explanation where the coordinates were those of stationary objects. The difference between the two screen space positions now gives the screen space vector, $m_{object}$, that describes the motion of the object on the screen arising from it's movement in world space alone:

$$m_{object} = s'_n - s'_{n-1}$$

Moving Objects with Camera Movement.

The motion of an object in screen space can be described as the sum of the vector due to any camera movement and the vector due to any object movement in world space:

$$m_{motion} = m_{camera} + m_{object}$$

Figure 9:
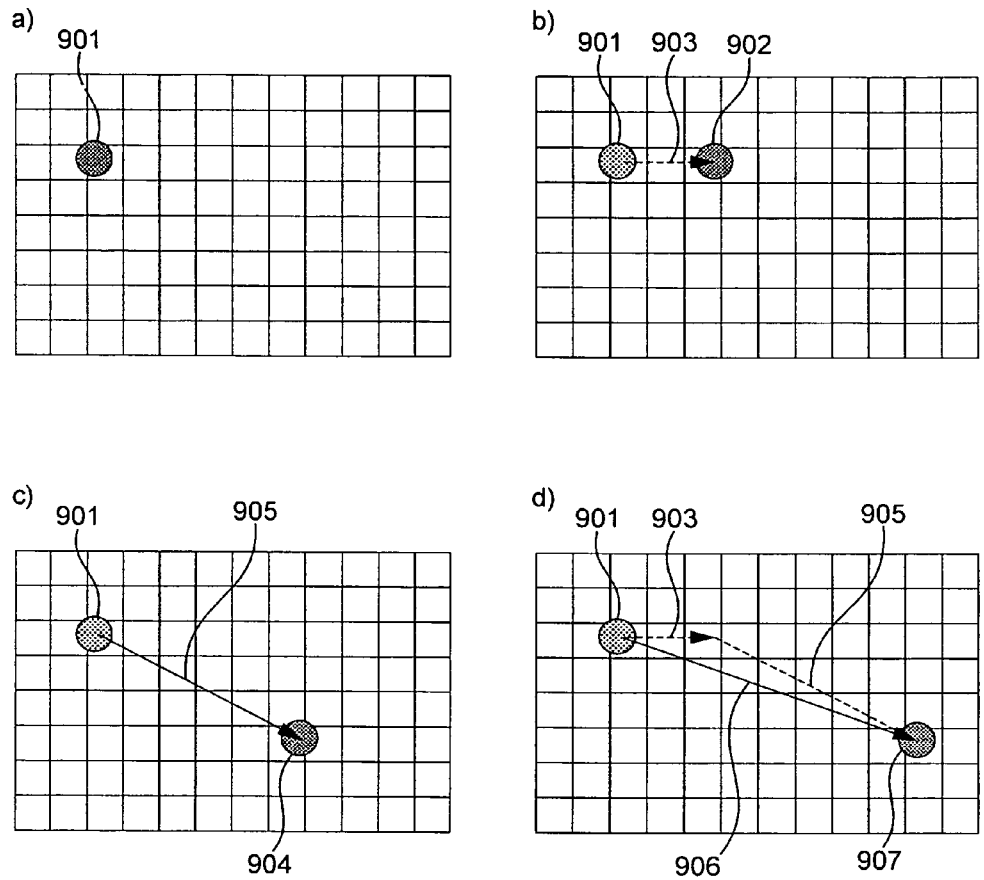
FIG. 9 shows a screen space motion vector which is the sum of a vector due to motion of the object in world space and a vector due to the transformation of the position and direction of view of the camera.

FIG. 9 shows how the observed motion of an object in screen space is composed of a vector due to object motion in world space and a vector due to a change in the camera transform. Motion of an object in world space (in the absence of any camera transformation) is observed in screen space as an object moving from position 901 to position 902 along vector $m_{object}$ (903). If the same object had remained static in world space but there had been a change in camera transform, the point at position 901 would have moved to position 904 along vector $m_{camera}$ (905). The effective motion in screen space of the moving object as viewed during a change in camera transform is the sum of vectors 903 and 905, which result in the object moving from position 901 to 907 along vector $m_{motion}$ (906).

Decomposing the motion estimation problem into two components allows us to apply the methods disclosed in this patent to significantly improve the motion estimation process on complex scenes.

Determining $m_{camera}$.

The camera's position and orientation, typically in the form of matrices $C_{n-1}$ and $C_n$, are assumed to be available directly from the graphics engine or from some other source or approximated using an appropriate method. When information about the depth of pixels in the scene (i.e. the depth buffer) is also available to the motion estimation system this allows the calculation of camera transformation vectors, $m_{camera}$, for every pixel in the frame as described above.

Figure 7:
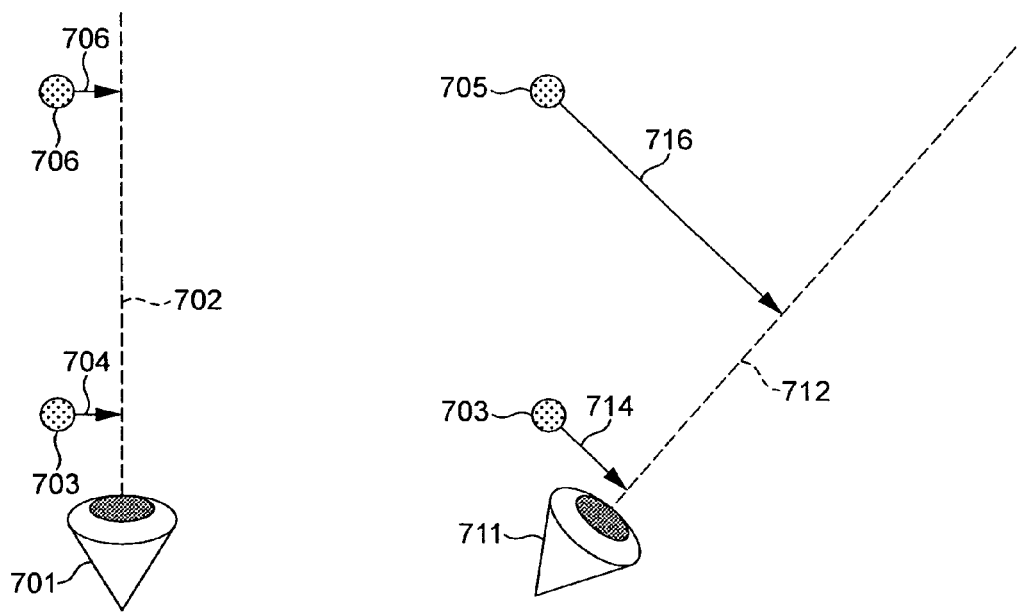
FIG. 7 illustrates the dependence of screen space motion resulting from camera movement on the camera to object distance.
Figure 8:
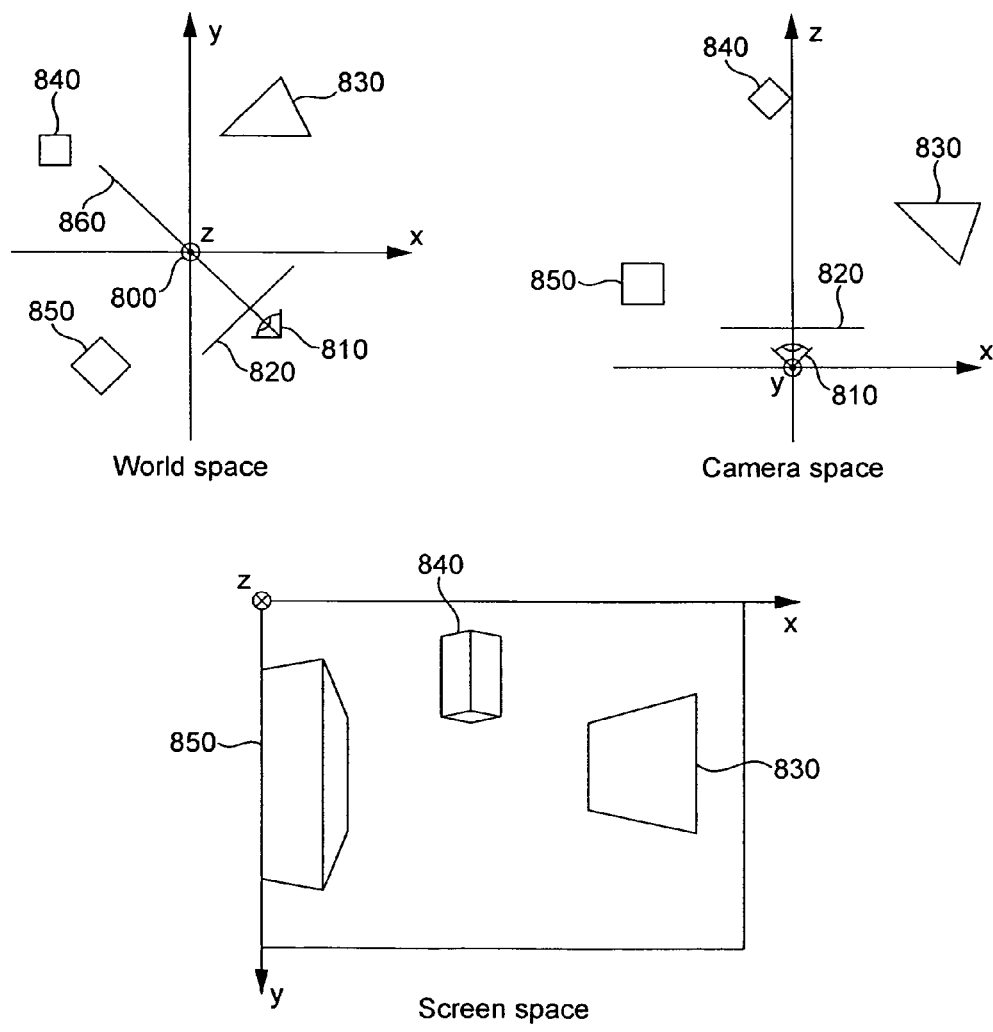
FIG. 8 shows an example of different coordinate systems used in 3D computer graphics.

The way in which screen space motion depends on depth is illustrated in FIG. 7. The camera is at position 701. Vector 702 identifies the direction in which the camera is pointed, and the centre of the field of view. Objects 703 and 705 are at different distances from the camera, but both are similar distances (704, 706) from the centre of the field of view. When the camera is rotated (711) and the view direction changes to 712, it can be seen that although the objects 703 and 705 have not moved in world space, they are now at different distances (714, 716) from the centre of the new field of view (712). The two objects will appear to move relative to each other when the image is projected onto the screen.

In the absence of depth information for the scene the camera matrices can be used to predict the likely trends in motion of pixels in the scene based on their location in the image (as illustrated in FIG. 3 to FIG. 6). For example in FIG. 3, if the camera moves down, the image on the screen is likely to appear to move up. Although the absence of depth information means that an exact value for $m_{camera}$ cannot be calculated, the information can be used to bias candidate vectors in the appropriate direction. This biasing could include methods such as generating more motion vector candidates that are aligned with the predicted direction of on-screen movement, extending search ranges along the predicted alignment or biasing the candidate selection mechanism.

Since a depth buffer typically provides a depth value for every pixel in the image, an $m_{camera}$ vector can also be calculated for every pixel in the image. This often provides more vector candidates than a motion estimator can reasonably use. For example, a simple block based motion estimator may use a single vector to represent the motion of a block of pixels, or a more sophisticated design may use several vectors per block, but the number of vectors per block is typically significantly fewer than the number of pixels in the block. In these cases one of numerous possible methods can be used to reduce the large number of per-pixel vectors to a smaller number of per-block vectors. For example, if one depth can be found that is representative of the depths of a group of pixels then one set of transformation calculations can provide an $m_{camera}$ vector for that group of pixels. A representative depth of pixels may be found using averages such as the mean, mode, or median. If the pixels in a block can be classified into several groups on the basis of their depth values then this allows one $m_{camera}$ vector to be calculated for each group.

The classification of pixel groups according to depth may also be used to identify a boundary between objects, or between foreground and background areas of an image. There is clearly a benefit to motion estimation performance in being able to calculate $m_{camera}$ separately for each group of pixels. Further improvements that may be made in the calculation of $m_{object}$ are described below.

Determining $m_{object}$.

The absence of information about object position and motion in world space means that the vector $m_{object}$ must be determined through motion estimation. Motion estimators operating in screen space actually find the total screen space motion vector, $m_{motion}$, from which $m_{object}$ can be calculated by subtraction of $m_{camera}$:

$$m_{object} = m_{motion} - m_{camera}$$

Figure 1:
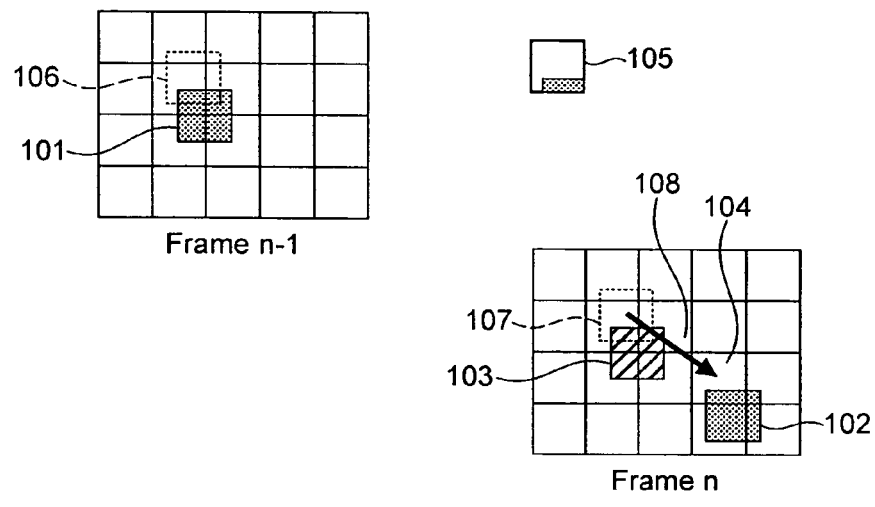
FIG. 1 illustrates a typical block matching motion estimator.
Figure 2:
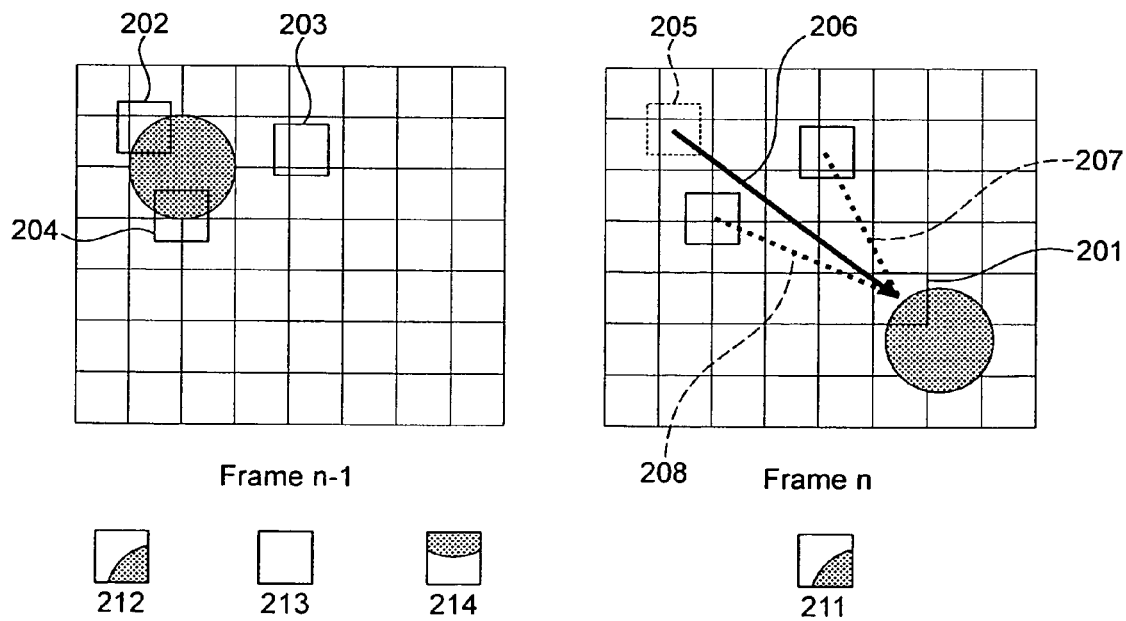
FIG. 2 illustrates how a block matching motion estimator selects a 'best' motion vector from a set of candidate motion vectors.

A motion estimator such as the typical block based type illustrated in FIG. 1 and FIG. 2 compares the pixels of each block in the current frame with pixel data areas from the previous frame with spatial offsets equal to each of a number of candidate motion vectors. These pixel data areas are of block size but are not necessarily constrained to being block aligned. As motion vectors are usually assumed to be highly correlated both spatially and temporally with vectors in adjacent blocks, these neighbouring vectors are often used as the basis for selecting the candidate motion vectors used by the motion estimation for a particular block.

A difficulty arises in using a conventional motion estimator to find $m_{motion}$ because rapid and/or erratic camera transformations can make assumptions about consistency of motion and predictability from one frame to the next unreliable. Furthermore, motion estimators typically operate over a limited search area when attempting to find matching pixel data areas. If motion is so large that matches cannot be found in the available search area then motion estimation will fail. There is often some flexibility in the placement of the search area, but this is only useful if the approximate motion can be predicted before the motion search begins.

Using the $m_{camera}$ & $m_{object}$ Vectors to Produce Better Motion Vector Candidates.

Knowledge of $m_{camera}$ allows the motion estimation system to compensate for the component of motion caused by movement of the camera.

For example, an existing motion estimation system might test four vector candidates, a, b, c, and z (the zero vector), in a search range centred at an offset of zero from the current block. If a sudden camera movement has occurred then none of these candidates are likely to give good pixel matches. In the current invention, $m_{camera}$ is computed from camera matrices and depth values for the current block, and leads the motion estimator to centre its search area on a position offset by $m_{camera}$ from the current block. The vectors searched are $a+m_{camera}$, $b+m_{camera}$, $c+m_{camera}$ and $m_{camera}$. The search is now considerably more likely to find a good match, because the effect of the camera movement has been compensated for.

The choice of vector candidates in an existing system may be based on results that have already been calculated for neighbouring blocks. For example, as motion estimation proceeds, the motion estimator will store the best motion vector, m, for each block in a memory array. Since it is known that there is a high degree of spatial and temporal consistency in the vector fields, the motion vector candidates for a block are likely to include vectors taken from the m arrays for the current and previous frames. Four typical vector candidates are therefore $m_{above}$ and $m_{left}$, taken from neighbouring blocks in the current frame, $m_{prev}$, taken from a co-located block in the previous frame, and the zero vector, z. As has been seem, these vectors may not be good candidates in the event of camera motion. In particular, $m_{prev}$ is unlikely to be a good candidate if there has been a change in camera motion since the previous frame, and $m_{above}$ and $m_{left}$ are unlikely to be good candidates if the camera movements include rotations or movement perpendicular to the plane of the screen, as these cause non-uniform vector fields, as illustrated in FIG. 4 and FIG. 6 respectively.

In this invention, the motion estimation stores two vectors, preferably $m_{motion}$ and $m_{object}$, in the memory array. Any pair of vectors, from $m_{motion}$, $m_{object}$, $m_{camera}$, may be stored, and the third calculated as required using the known relationship between the three. The overall screen space motion, $m_{motion}$, is typically required as the output of the motion estimator. The $m_{object}$ vectors may be used to provide vector candidates which are not affected by camera movements. In a similar example to that of the existing system above, the four object motion vector candidates would be $m_{object,above}$, $m_{object,left}$, $m_{object,prev}$, and z. Finally, compensating for the camera motion as before, the candidates tested would be $m_{object,above}+m_{camera}$, $m_{object,left}+m_{camera}$, $m_{object,prev}+m_{camera}$, and $m_{camera}$.

Figure 13:
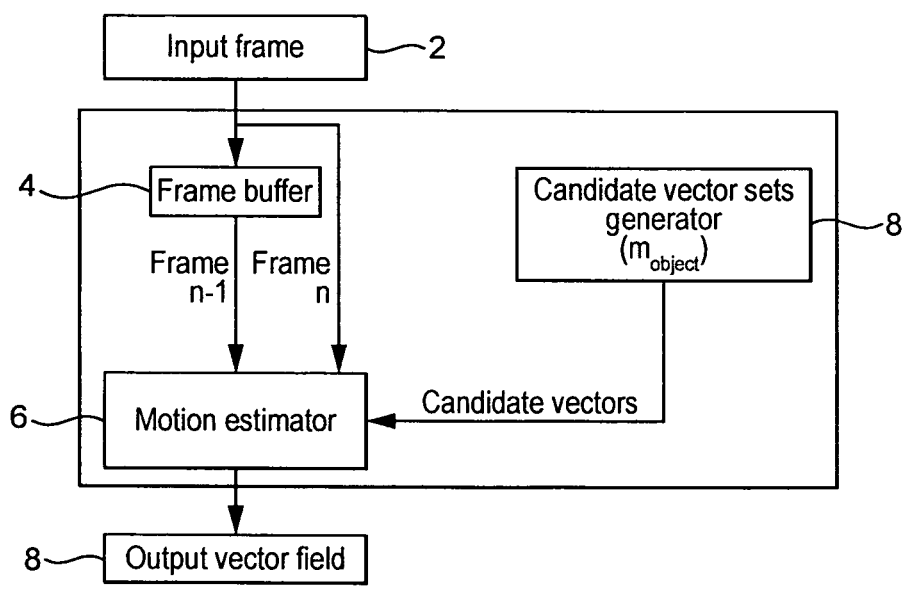
FIG. 13 shows a system level block diagram of a traditional motion estimator.

FIG. 13 shows a typical system level block diagram of a motion estimator with no awareness of camera motion. An input frame is compared with the previous input frame in the sequence using a set of candidate motion vectors generated at each block location. The resulting output vector field is produced by storing the best match/lowest difference candidate at each block location. The 'candidate vector sets generator' produces a set of candidate motion vectors at each block location and these candidate vectors are unable to predict rapid changes in camera position and/or orientation.

The block diagram of FIG. 13 comprises input frame N at 2. A previous frame N−1 is stored in a frame buffer 4. The input frame N is compared with frame N−1 in a motion estimator 6 using a set of candidate vectors generated in a candidate vector set generator 8 which may generate candidate vectors in accordance with a number of well known methods. The output of the motion estimator is an output vector field for locks or pixels in the image.

Figure 14:
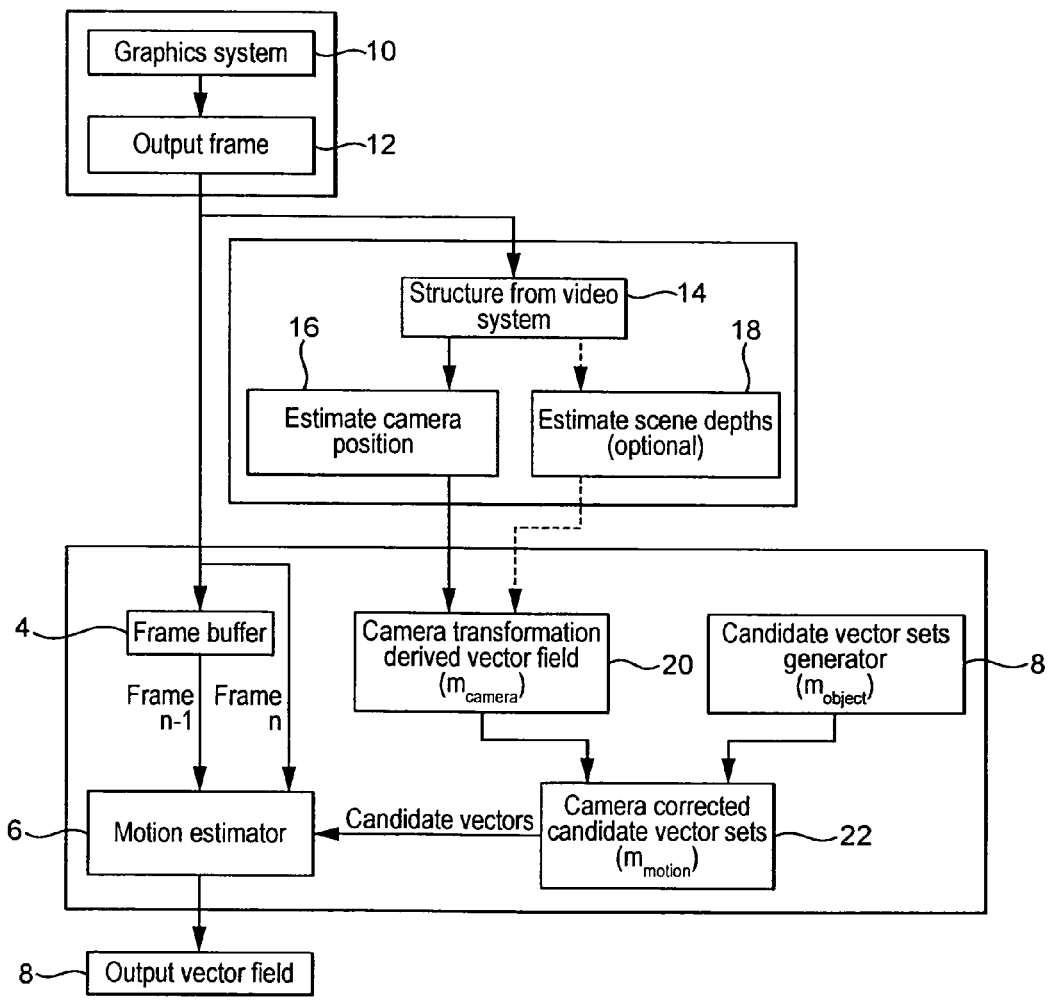
FIG. 14 shows a system level block diagram of a motion estimator where an external "structure from video" system is used to calculate approximations of the camera position and orientation, and this information is used to improve the candidate vectors during motion estimation.

FIG. 14 shows a system level block diagram of a motion estimator using an external 'structure from video' system to approximate changes in camera orientation and optionally approximate the depth of objects in the scene. In the absence of depth information the system is able to predict the general trends of motion for different regions of the screen due to the camera motion alone. This information can then be combined with the candidate vector sets to bias towards or against candidates, offset the search area or modify the candidate set. If a sufficiently accurate depth model can be determined by the 'structure from video' system then the system can be processed as if the information was provided by the graphics engine.

In FIG. 14, a graphics system 10 generates output which is for the output frame 12. These become the frames N and N−1, one of which is stored in the frame buffer 4 before the two are compared in motion estimator 6 to provide the output vector field 8.

The output of frame 12 passes to a structure from video system 14 which is used to assist in the derivation of candidate vector sets. This sends data related to the video system to an estimate camera position unit 16 and optionally to an estimate scene depth unit 18. The output of the estimate camera position unit 16 and optionally the output of the estimate scene depths unit 18 are supplied to a camera transformation derived vector field 20 corresponding to pixels or blocks of pixels in the image. This camera transformation derived vector field is then combined with a candidate vector from the candidate vector sets generator 8 in a camera corrected candidate vector sets unit 22. These camera corrected candidate vector sets are then used by the motion estimator 6.

Figure 15:
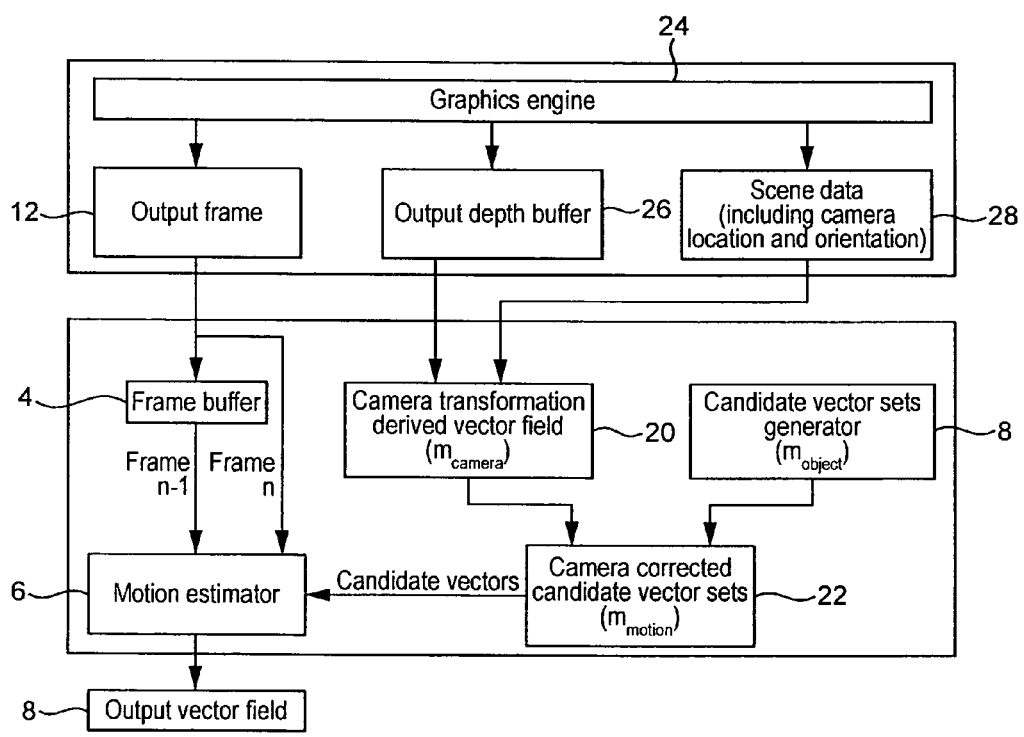
FIG. 15 shows a system level block diagram of a motion estimator where full information about camera/viewer location and orientation and the scene's depth buffer is provided by a graphics engine, and is used to improve the candidate vectors used during motion estimation.

FIG. 15 shows the proposed system level block diagram of a motion estimator using information about changes in camera orientation and distance to objects in the scene provided by the graphics engine. This information allows the calculation of a 'camera transformation derived vector field' using the methods outlined previously. The 'candidate vector sets' predicting the motion of the object in the scene and the 'camera transformation derived vector field' predicting the apparent motion due to the camera can then be combined into a field of 'camera corrected candidate vector sets'. These candidate vectors can then be used in the motion estimator and be expected to prove better predictions for true motion than those available in the system without graphics engine derived vector corrections.

In FIG. 15 a graphics engine 24 provides an output frame 12 which, using frame buffer 4 can provide frame N and N−1 to motion estimator 6 to provide an output vector field 8.

The output graphics engine also provides data to an output depth buffer corresponding to depths of objects at pixels or groups of pixels. It also provides scene data including camera location and orientation at 28. Data from the output depth buffer 26 and scene data unit 28 form the inputs to a camera transformation derived vector field unit 20 as in FIG. 14. Vectors from this are combined with candidate vector sets from a candidate vector sets generator 8 in the camera corrected candidate vector sets A practical system would, of course, be likely to test a larger number of motion vector candidates than the examples shown above. In particular, a random element is normally required. The same principle of compensating for camera motion can be applied to some or all of the motion vector candidates.

Situations in which compensation for camera movement is particularly useful is in the calculation of temporal vector candidates, such as $m_{object,prev}$, described above. By isolating the component of motion due to an object moving in world space from the component caused by camera movement more accurate approximations of physical effects such as momentum and acceleration can also be determined. In our United Kingdom patent application no. 0907039.2, we describe a system which models the momentum and acceleration of objects, generating motion vector candidates at a position offset from the current position of an object such that a candidate likely to represent the motion of the object is placed at a location where the object is likely to appear in future frames. Clearly such a system can be susceptible to camera movement effects, where the apparent movement of an object that is expected to be moving with constant velocity or constant acceleration is made unpredictable by camera movements which are independent of the motion of the object.

Figure 11:
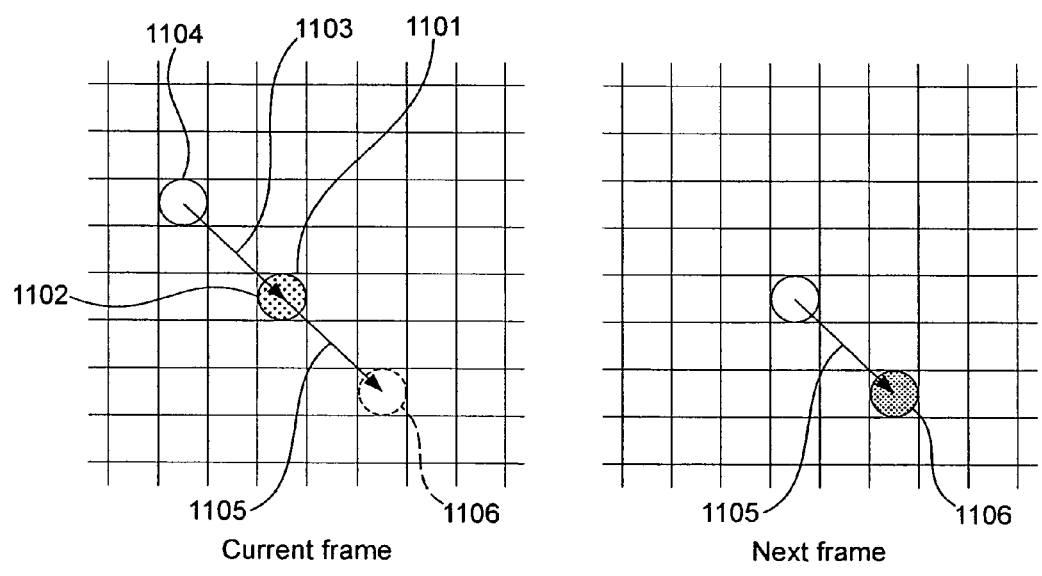
FIG. 11 shows an example of momentum candidate vector lookup in prior art systems.

FIG. 11 illustrates how a momentum candidate is generated in the system of United Kingdom patent application no. 0907039.2. A block 1101, contains an object, 1102. The position of the object in the previous frame is also shown, in pixel area 1104. Motion estimation selects motion vector 1103 to represent the motion at block 1101. This vector suggests that any object moving with constant velocity and present in block 1101 in the current frame is likely to have moved into block 1106 in the next frame. Provided the object does continue to move with the same velocity then a motion vector 1105, equal in size and direction to 1103 but spatially offset, is a good prediction for continuing motion. A copy of the vector selected by motion estimation in block 1101 is therefore stored in a memory, at a position corresponding to block 1106 in the next frame, where it will be used as a motion vector candidate.

The same method of compensating for camera movement can be applied in such a system, by subtracting the motion component $m_{camera}$, and making vector calculations such as the calculation of momentum $m_{object,mom}$ and acceleration $m_{object,accel}$ candidate vectors using the $M_{object}$ component. A vector stored at a location offset from the current block position by either $m_{object,mom}$ or $m_{object,accel}$ does not normally coincide with the screen space position of the object in the next frame, as that position depends on a camera vector, $m_{camera,n+1}$ which has not yet been computed. The lookup locations of momentum or acceleration candidates in the next frame must therefore also be compensated by the camera vector computed at that time.

Figure 12:
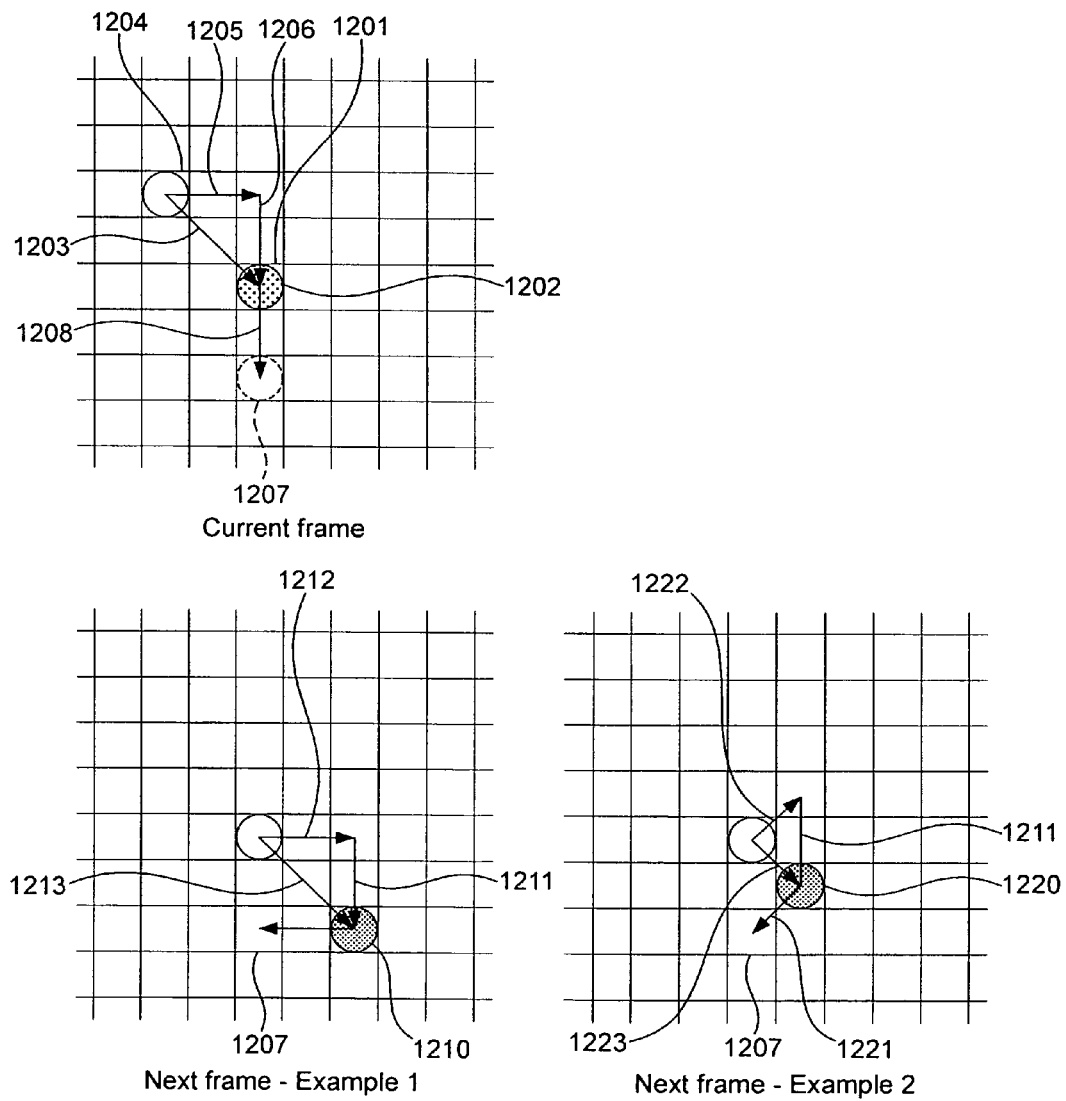
FIG. 12 shows examples of momentum candidate vector lookup compensated for camera motion.

FIG. 12 shows the system of FIG. 11 extended to compensate for camera motion. The screen space motion vector 1203 is known to be the sum of a vector due to camera motion, 1205, and a vector due to object motion, 1206. The momentum vector candidate 1208 is a copy of the component of the motion that is due to object motion, and is stored at a memory location corresponding to the block 1207 that is offset from the current block position, 1201, by that vector.

FIG. 12 gives two examples for how camera motion is compensated for in the lookup of the momentum vector candidate. In the first example, motion estimation is taking place at block 1210. The object component of the vector is retrieved from block 1207, which is offset from the current block by the negated camera vector, $-m_{camera}$. The vector retrieved is 1211, which when added to the camera vector 1212, gives motion vector candidate 1213. It can be seen that in this case, vector 1213 correctly predicts the motion of the object.

In the second example the motion estimation is taking place at block 1220, and the camera vector has changed to 1222 such that the negated camera vector, 1221, indicates that the object component should be retrieved from block 1207. The vector is again 1211, which when added to the camera vector 1222 gives overall screen space motion vector candidate 1223. It can be seen that, again, this candidate correctly predicts the motion of the object, and that an accurate candidate has been computed despite the change in camera motion.

The discussion above and in United Kingdom patent application no. 0907039.2 describes the modelling of the motion of physical objects in screen space. The person skilled in the art will appreciate that the same principles can alternatively be applied in world space. Modelling in world space makes the predictions of future motion and position independent of the method of projection used, and may be more robust in cases where the projection distorts the screen space image, e.g. a simulation of a fish-eye lens.

Using Depth Values to Produce Higher Resolution Motion Vectors.

Where depth values are available, and pixels in a block have been classified according to depth, the motion estimator may use this information to improve motion estimation by sub-dividing a block and assigning two or more vectors to the sub-block regions.

A higher resolution may be obtained by splitting a lock into groups of pixels with similar depth and assigning vectors to these.

Figure 10:
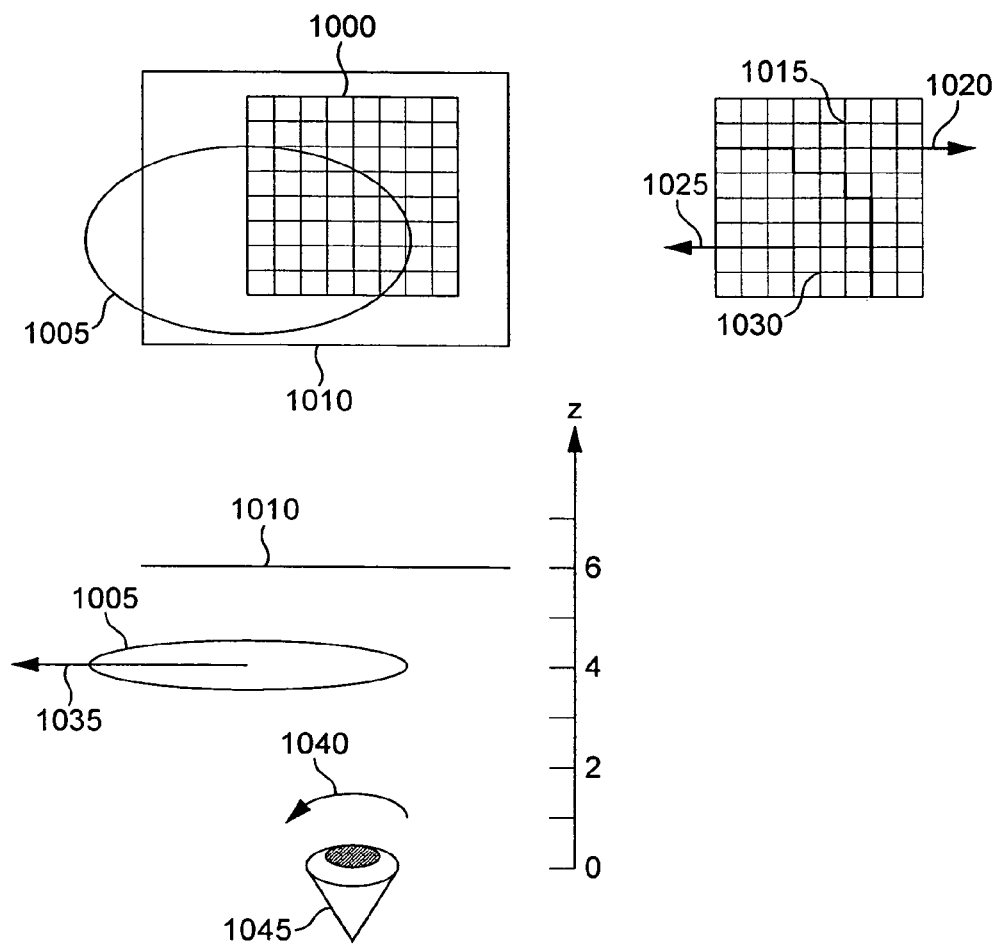
FIG. 10 shows how classification of pixels according to their depth values allows multiple motion vectors to be assigned to a single block.

A simple example is illustrated in FIG. 10, where block 1000 contains an object edge. Pixels inside the edge are part of a moving object 1005, while pixels outside the edge contain a stationary background object 1010. The arrangement in shown in screen space, and also in plan view, where it can be seen that object 1005 is closer to the camera position 1045, than the background object 1010, i.e. the foreground object and background have different depth values. The camera is panning from right to left, as illustrated by arrow 1040, and object 1005 is also moving from right to left, at a greater speed. In this case the classification system would identify two groups of pixels, 1015 and 1030, based on the similarity of the depth values within each group, and the dissimilarity of the two groups to each other.

Motion estimation may then proceed independently for each group of pixels, with the pixel classification being used to derive a mask at a resolution finer than that of the whole block. Ideally the mask would be at the resolution of individual pixels. The mask may then be used to include only the pixels in that group in the calculation of the scoring function (e.g. SAD or MSD) for each motion vector candidate. Typically the same set of motion vector candidates would be used for each groups of pixels, but sets of motion vector candidates may also be prepared independently for each group, for example by preferring to select candidates from neighbouring blocks that also have similar depth values.

In FIG. 10, it can be seen that vector 1020, representing the observed movement of the stationary background 1010 due to camera movement 1040, is assigned to pixel group 1015, while vector 1025, the overall screen space motion of object 1005 is assigned to pixel group 1030.

Such a method does not add significantly to the computational requirements of the system, since, for example in calculating an SAD, the same number of pixel difference calculations are required as for a whole-block SAD. The mask is used to accumulate each difference in one of two accumulators, so as to produce an independent SAD for each pixel group.

The pixel classification system may clearly be extended to identify more than two groups of depth values, allowing more than two vectors to be assigned to each block.

The use of multiple motion vectors per block is valuable in applications such as motion compensated frame rate conversion. A single vector per block is unable to represent the motions at the silhouette edge of a moving object, and this can lead to visible 'halo' artefacts around moving objects. The 'halo' effect is considerably reduced by the use of multiple motion vectors calculated using the method described here.

We claim:

1. A method for motion estimation in a sequence of image data, comprising:
   characterizing movement of a camera or viewer, comprising a change in one or more of view direction and position, between a pair of fields or frames in a sequence of image data;
   determining respective sets of candidate motion vectors for positions of objects in one of the fields or frames relative to positions of the objects in the other of the fields or frames; and
   adjusting the sets of candidate motion vectors using the characterized movement of the camera or viewer position, the adjusting comprising at least one of (1) adjusting criteria for selecting candidate motion vectors, in dependence on the characterized movement of the camera or viewer position and (2) adjusting one or more of a direction and a magnitude of a candidate motion vector in dependence on the characterized movement of the camera or viewer position; and
   deriving, by motion estimation, and using the respective sets of candidate motion vectors, a set of motion vectors for describing movements of regions in the one of the fields or frames in the pair relative to the other of the fields or frames of the pair, separated from movements of those regions attributable to the characterized movement of the camera or viewer position.

2. A method according to claim 1, wherein the adjusting of the criteria for selecting candidate motion vectors comprises offsetting a normal search range for candidate motion vectors by an amount based on the characterized movement of the camera.

3. A method according to claim 1, wherein the adjusting of the criteria for selecting candidate motion vectors for each region comprises biasing the motion estimation process to favor candidate motion vectors predicted by the characterized movement of the camera or viewer.

4. A method according to claim 1, further comprising modifying a scoring function used to select vectors from the set of candidate motion vectors during the motion estimation process to favour candidate vectors similar to a motion vector predicted by the characterized movement of the camera or viewer.

5. A method according to claim 1, wherein each candidate motion vector is defined as a sum of a vector derived from the characterized movement of the camera or viewer and a vector representing an estimated true motion of a respective object to which that candidate motion vector applies.

6. A method according to claim 5, further comprising storing a vector representing an estimated true motion of its respective object and using that stored vector in a set of candidate vectors for object motion in a temporally subsequent field or frame.

7. A method according to claim 6 wherein the storing of the vector representing the estimated true motion of its respective object comprises storing the vector at a location offset from a location associated with a current location of the object, the offset determined according to the vector being stored.

8. A method according to claim 1 further comprising grouping pixels according to similar depth, if depth information for the pixels is available, and performing motion estimation for each group of pixels between the pair of fields or frames.

9. A method according to claim 1, wherein the deriving of the set of motion vectors operates at a resolution dependent on a resolution of available depth information.

10. A method according to claim 6, wherein the determining respective sets of candidate motion vectors comprises selecting vector candidates from neighbouring locations that share a similar depth with a current group of pixels.

11. A method according to claim 6, wherein the deriving of the set of motion vector candidates comprises using a scoring function to select vectors from a respective set of candidates to favour candidate vectors originating from locations that share a similar depth with a current group of pixels.

12. Apparatus for motion estimation of a sequence of images comprising:
   an estimator configured for characterizing movement of a camera or viewer position and direction between a pair of fields or frames in the sequence of images derived from a 3-D scene;
   a candidate motion vector set generator configured for determining respective sets of candidate motion vectors for positions of objects in one of the fields or frames relative to the other field or frame; and
   a module configured for adjusting the sets of candidate motion vectors using the motion vectors representing movement of the camera or viewer position, the adjusting comprising at least one of (1) adjusting criteria for selecting candidate motion vectors, in dependence on the characterized movement of the camera or viewer position and (2) adjusting one or more of a direction and a magnitude of a candidate motion vector in dependence on the characterized movement of the camera or viewer position; and
   a motion estimator configured for receiving the sets of candidate motion vectors and for deriving, by motion estimation, and using the respective sets of candidate motion vectors a set of motion vectors describing movement of regions between the pair of fields or frames, separated from movement of those regions attributable to the characterized movement of the camera or viewer position candidate motion vectors.

13. An apparatus according to claim 12 wherein the candidate motion vector set generator is configured for offsetting a normal search range for selecting candidate motion vectors by an amount predicted by the change in camera position or direction.

14. An apparatus according to claim 12 wherein the candidate motion vector set generator is configured for biasing selection of motion vectors towards motion vectors that are in a direction of a motion vector predicted by the change in camera position or direction.

15. An apparatus according to claim 12, wherein the candidate motion vector set generator is configured for biasing selection of motion vectors by modifying a scoring function used to select motion vectors to be part of the set of candidates vectors.

16. An apparatus according to claim 12 wherein depth information for pixels in the sequence of images is used to compute predicted motion of the pixels due to the change in camera position or direction.

17. An apparatus according to claim 16 wherein each candidate motion vector comprises a sum of a vector due to the change in camera position or direction and a vector due to the movement of an object in the scene.

18. An apparatus according to claim 17 wherein the module is configured for avoiding adjustment of candidate motion vectors selected from neighbouring locations within the field or frame and for adjusting candidate motion vectors from the other field or frame in the pair.

19. An apparatus according to claim 18 further comprising a memory for storing candidate motion vectors at locations offset by a vector equal to a composition of motion due to movement of objects within the scene.

20. An apparatus according to claim 18 wherein the module is configured for fetching of candidate motion vectors previously stored at locations offset by an amount derived from the characterized movement of the camera position or direction.

21. A method for motion estimation in a sequence of 2-D images of claim 1, comprising producing a camera transformation derived vector field having entries corresponding to a respective pixel or region of pixels, each entry approximating an effect of motion by the camera on the pixel or region of pixels to which that entry pertains.

22. A method for motion estimation in a sequence of 2-D images of claim 1, wherein the characterizing of movement of a camera or viewer comprises producing a vector field describing movement of regions between the pair of fields or frames attributable to the characterized movement of the camera or viewer.

23. An apparatus for motion estimation of a sequence of images of claim 12, further comprising a graphics engine configured to output the images and indicia of movement of the camera or viewer position between the images.

* * * * *